No. 615,871. Patented Dec. 13, 1898.
R. MÖLLER.
LAND OR WATER BICYCLE.
(Application filed Nov. 29, 1897.)
(No Model.)
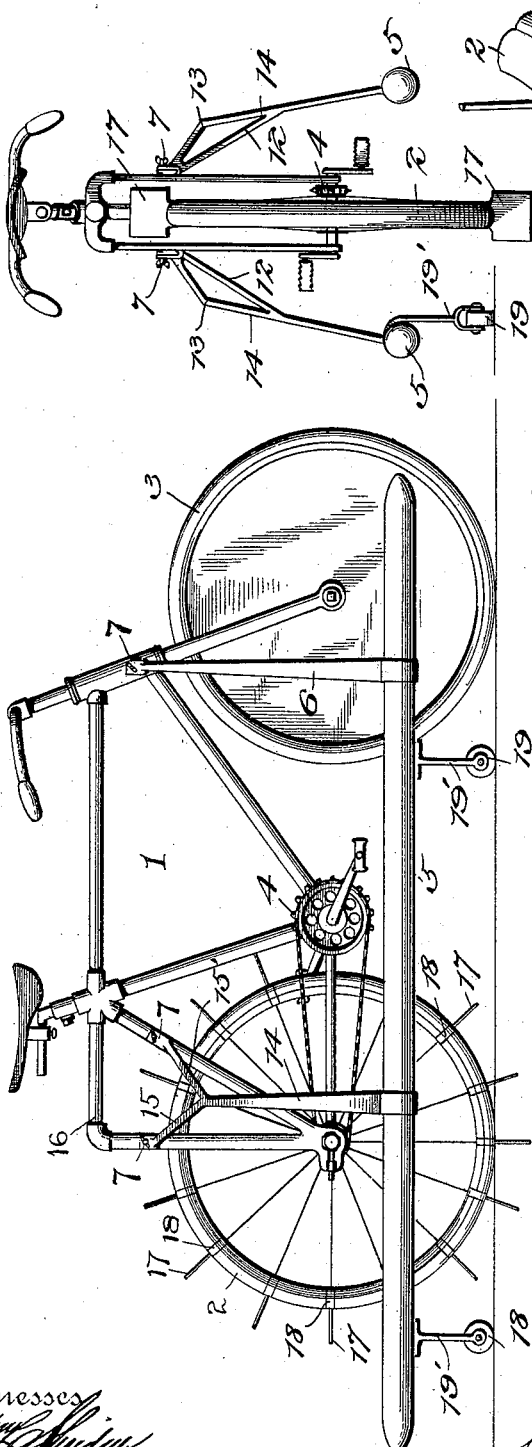

UNITED STATES PATENT OFFICE.

RICHARD MÖLLER, OF BENNETT, PENNSYLVANIA.

LAND OR WATER BICYCLE.

SPECIFICATION forming part of Letters Patent No. 615,871, dated December 13, 1898.

Application filed November 29, 1897. Serial No. 660,143. (No model.)

*To all whom it may concern:*

Be it known that I, RICHARD MÖLLER, a citizen of the United States, residing at Bennett, in the county of Allegheny and State of Pennsylvania, have invented certain new and useful Improvements in Land or Water Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a superior land or water vehicle operating on the plan of an ordinary bicycle and so arranged that it can be quickly converted into either one or the other.

To this end my invention consists in the peculiar features and combinations of parts more fully described hereinafter, and pointed out in the claims.

In the accompanying drawings, Figure 1 represents a side elevation of my complete invention arranged as a water-vehicle. Fig. 2 is an end view thereof; Fig. 3, a detail view, partly in section, showing the attaching device by means of which the floats are attached; and Fig. 4 is a top view of a variation in the propelling apparatus.

The reference-numeral 1 denotes an ordinary diamond frame, and 2 and 3 the front and rear wheels of a bicycle. The body of the front wheel 3 consists of a solid circular sheet of metal or other suitable material and is for steering. The rear wheel 2 is a spoke-wheel for driving purposes, the same as in an ordinary bicycle, and is driven by a chain-and-sprocket gearing 4. Thus constructed and arranged the vehicle is ready for use on land.

In order to use it on water, I provide it with a pair of horizontal floats 5, extending longitudinally on either side of the wheel and in such juxtaposition in relation to the rider that the rider's weight will fall about centrally upon the floats. These floats are pointed at their front and rear ends to facilitate their progress through the water and operate on the principle of a catamaran or raft, the bicycle mechanism extending longitudinally midway between the float. The front portions of the floats are supported on the bicycle-frame by laterally-divergent hangers 6, which have their upper ends removably attached by clamps 7. These clamps each consist of a T-head 8, fixed on the side of the bicycle-frame. This T-head is embraced from beneath by a socket 9, open at the top to receive the T-head, and a thumb-nut 10, having an L-shaped stem 11, which passes through the top of the socket 9, can be turned up or down to engage or disengage the top of the T-head, and thereby fasten or loosen the clamp. Brace-rods 12 serve to strengthen the hangers at their elbows 13. The rear hangers 14 are substantially the same as the front hangers, being provided with the same kind of clamps 7 at the top. To strengthen these rear hangers still more against forward-and-backward play, the upper ends are provided with branching arms 15 and 15', clamped to the opposite sides of the rear portion of the frame and to a rectangular rear extension 16, respectively.

The driving or propelling wheel 2 is provided with radial paddles 17, secured to the circumference by straps 18, which embrace the tire and rim of the wheel and can be turned around to lie within the circumference of the wheel, as shown in dotted lines in Fig. 1, when the wheel is being used on land.

Each of the two floats is supported when out of water by rollers 19 on the legs 19'.

The screw propelling mechanism shown in Fig. 4 can be used, when desired, in connection with the paddles on the propelling-wheel.

Having thus described my invention, what I claim as new, and desire to secure by Letters Patent, is—

1. The combination with a bicycle-frame, of a pair of floats removably secured thereon, said floats having wheels connected therewith located substantially on a level with the main wheels of the bicycle.

2. The combination with the frame of a bicycle, of a float extending alongside the frame, arms thereon, said arms terminating at their upper ends in a jaw, T-shaped lugs on the frame beneath which said jaws are adapted to engage and means for holding said jaws removably in engagement with said lugs.

3. The combination with the frame of a bicycle, of wheels one of which is provided with paddles which may be extended outside of or turned inside of the rim of the wheel and floats removably connected to the frame.

4. The combination with a diamond-shaped frame and a rectangular rear extension 16 secured thereon, of a float, an arm connected therewith, said arm pronged at its upper end the ends of which prong are removably secured respectively, to the rear end of the diamond frame and to the rectangular rear extension 16.

In witness whereof I affix my signature in presence of two witnesses.

RICHARD MÖLLER.

Witnesses:
W. C. YOUNG,
W. A. MOYLE.